US007201201B2

(12) United States Patent
Grenier

(10) Patent No.: US 7,201,201 B2
(45) Date of Patent: Apr. 10, 2007

(54) PAINTER'S TAPE DISPENSER WITH CUTTER

(76) Inventor: Charles F. Grenier, 11233 W. Evergreen La., Hanford, CA (US) 93230

( * ) Notice: Subject to any disclaimer, the term of this patent is extended or adjusted under 35 U.S.C. 154(b) by 0 days.

(21) Appl. No.: 11/217,415

(22) Filed: Sep. 2, 2005

(65) Prior Publication Data

US 2007/0051474 A1 Mar. 8, 2007

(51) Int. Cl.
*B26F 3/02* (2006.01)
*B32B 38/04* (2006.01)

(52) U.S. Cl. ........................ 156/527; 156/577; 225/56; 225/78

(58) Field of Classification Search ................ 156/577, 156/574, 527; 225/42, 47, 56, 57, 78; D19/67, D19/69
See application file for complete search history.

(56) References Cited

U.S. PATENT DOCUMENTS

| | | | | | |
|---|---|---|---|---|---|
| 1,213,102 | A | | 1/1917 | Hill | |
| 3,921,936 | A | | 11/1975 | Suter | |
| 4,511,427 | A | | 4/1985 | Karliner et al. | |
| 4,880,152 | A | * | 11/1989 | Trankle | 224/162 |
| 4,915,769 | A | | 4/1990 | Heil et al. | |
| 4,928,864 | A | | 5/1990 | Walker et al. | |
| 5,009,347 | A | | 4/1991 | Phelps | |
| 5,201,444 | A | | 4/1993 | Simonet | |
| 5,215,236 | A | | 6/1993 | Waddell | |
| 5,257,729 | A | | 11/1993 | Silvernail | |
| 5,269,871 | A | * | 12/1993 | Longworth et al. | 156/527 |
| 5,299,712 | A | | 4/1994 | Carlson et al. | |
| D347,589 | S | | 6/1994 | LaBate | |
| 5,433,359 | A | | 7/1995 | Flowers | |
| 5,641,109 | A | * | 6/1997 | Willoughby | 225/20 |
| 5,802,695 | A | | 9/1998 | Willoughby | |
| D400,419 | S | | 11/1998 | Chan | |
| 5,904,280 | A | | 5/1999 | Chan | |
| 5,961,066 | A | * | 10/1999 | Hambleton | 242/588.1 |
| 6,085,955 | A | | 7/2000 | Hicks et al. | |
| D437,682 | S | | 2/2001 | Steele | |
| D453,355 | S | * | 2/2002 | Potter et al. | D19/69 |
| D496,155 | S | | 9/2004 | Londono | |
| 2001/0035443 | A1 | | 11/2001 | Jones et al. | |
| 2002/0185512 | A1 | * | 12/2002 | Shah | 225/56 |
| 2004/0011473 | A1 | | 1/2004 | Van Tyle et al. | |
| 2004/0194895 | A1 | | 10/2004 | Steinberger | |
| 2004/0211523 | A1 | * | 10/2004 | Yu Chen | 156/523 |
| 2005/0145344 | A1 | * | 7/2005 | Mertins et al. | 156/579 |

OTHER PUBLICATIONS www.ristape.com retrieved Jul. 11, 2005.

* cited by examiner

*Primary Examiner*—Mark A. Osele

(57) ABSTRACT

The painter's tape dispenser with cutter has a base, a rotatable spindle for receiving a roll of tape, and a cutter mounted on the base, which is ergonomically dimensioned for a comfortable fit on the user's forearm. The base is generally triangular in shape, with a pair of elongated sides and a relatively narrow base of the triangle, so that the base is adapted to extend along the inside of the forearm between the elbow and the wrist. The spindle is mounted on the wide end of the base and the cutter is mounted opposite the base, which is retained on the forearm by a pair of straps. The tape dispenser is positioned ready for hands-free tape dispensing when the spindle is loaded with a roll of tape.

11 Claims, 4 Drawing Sheets

PAINTER'S TAPE DISPENSER WITH CUTTER

BACKGROUND OF THE INVENTION

1. Field of the Invention

The present invention relates generally to manually operated tape dispensers including a tape cutter, and more specifically to a tape dispenser with cutter configured to be mounted on a forearm.

2. Description of the Related Art

Several occupations have tasks that require the application of tape to a workpiece, often on a repetitive basis. For example, painters usually apply painter's tape or masking tape to floors, windows, and other surfaces when painting walls. Construction workers apply drywall tape to the joints between drywall. Medical personnel employ tape for a variety of purposes, including adhesive tape to secure dressings to wounds. Even law enforcement personnel employ tape to mark off crime scenes.

On such occasions, the persons applying the tape must perform other tasks with their hands while simultaneously applying the tape. In many cases, it often takes time for the worker to put aside what he or she is doing to retrieve a roll of tape, and sometimes also a tape cutter, from a toolbox or other storage location when it becomes necessary to apply the tape. Several tape dispensers that can be attached to the worker's wrist or arm have been developed to address these problems. However, none have proven to be entirely successful. Thus, a painter's tape dispenser with cutter solving the aforementioned problems is desired.

SUMMARY OF THE INVENTION

The painter's tape dispenser with cutter has a base, a rotatable spindle for receiving a roll of tape, and a cutter mounted on the base, which is ergonomically dimensioned for a comfortable fit on the user's forearm. The base is generally triangular in shape, with a pair of elongated sides and a relatively narrow base of the triangle, so that the base is adapted to extend along the inside of the forearm between the elbow and the wrist. The spindle is mounted on the wide end of the base and the cutter is mounted opposite the base, which is retained on the forearm by a pair of straps. The tape dispenser is positioned ready for hands-free tape dispensing when the spindle is loaded with a roll of tape.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
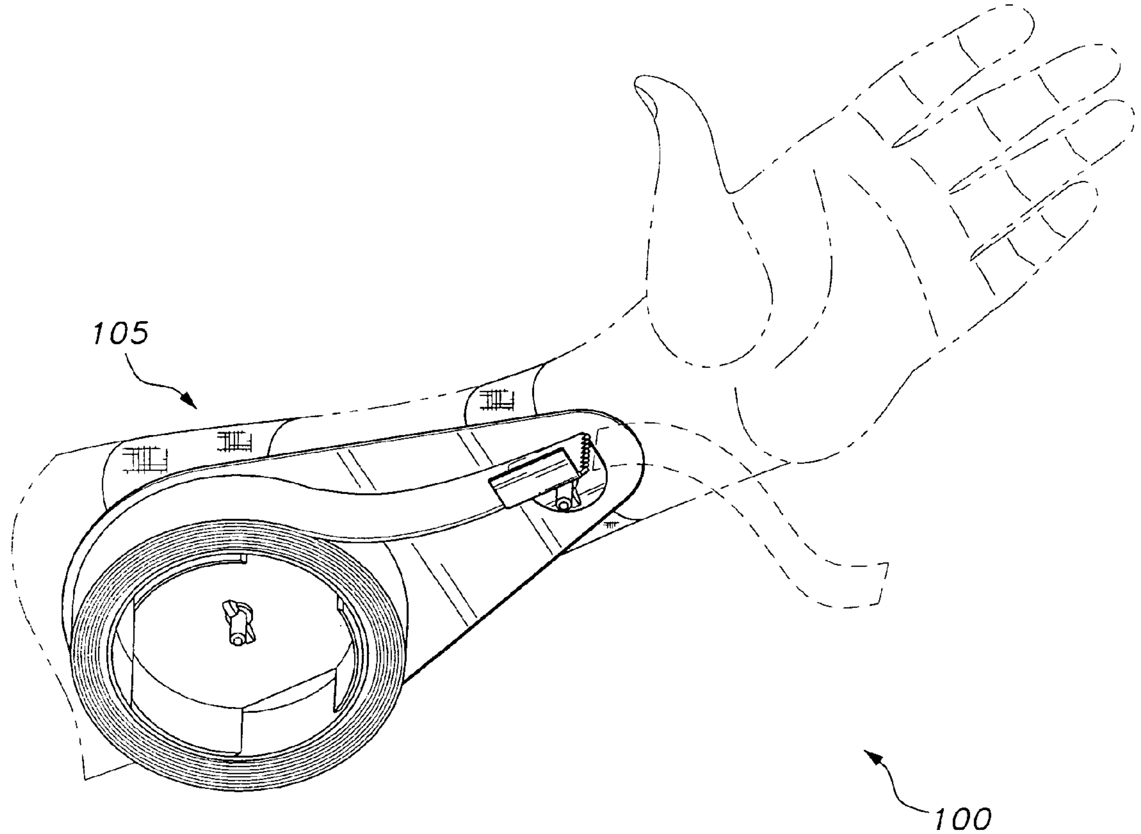
FIG. 1 is an environmental, perspective view of a painter's tape dispenser with cutter according to the present invention.
Figure 2:
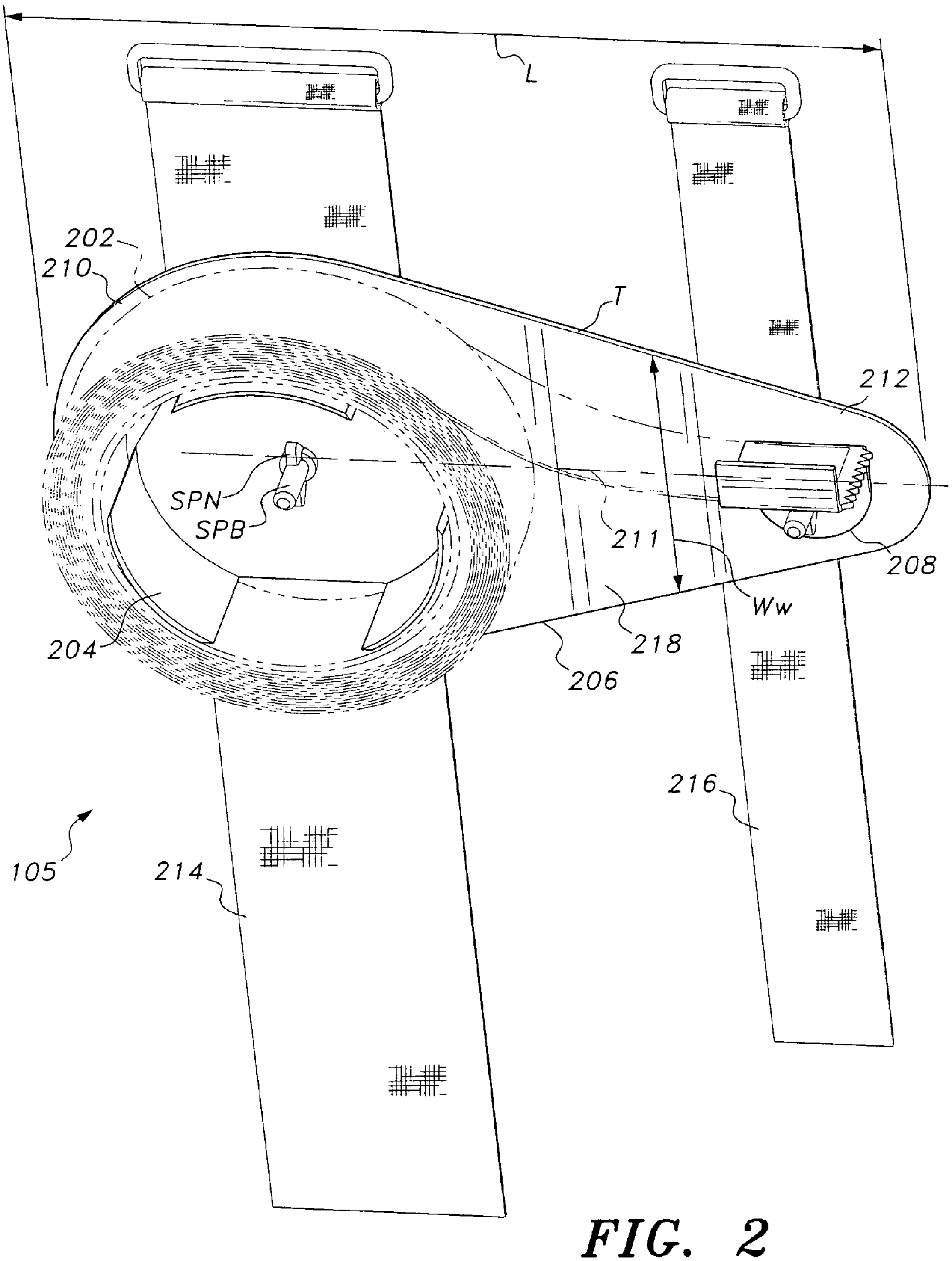
FIG. 2 is a perspective view of the painter's tape dispenser with cutter according to the present invention.
Figure 4:
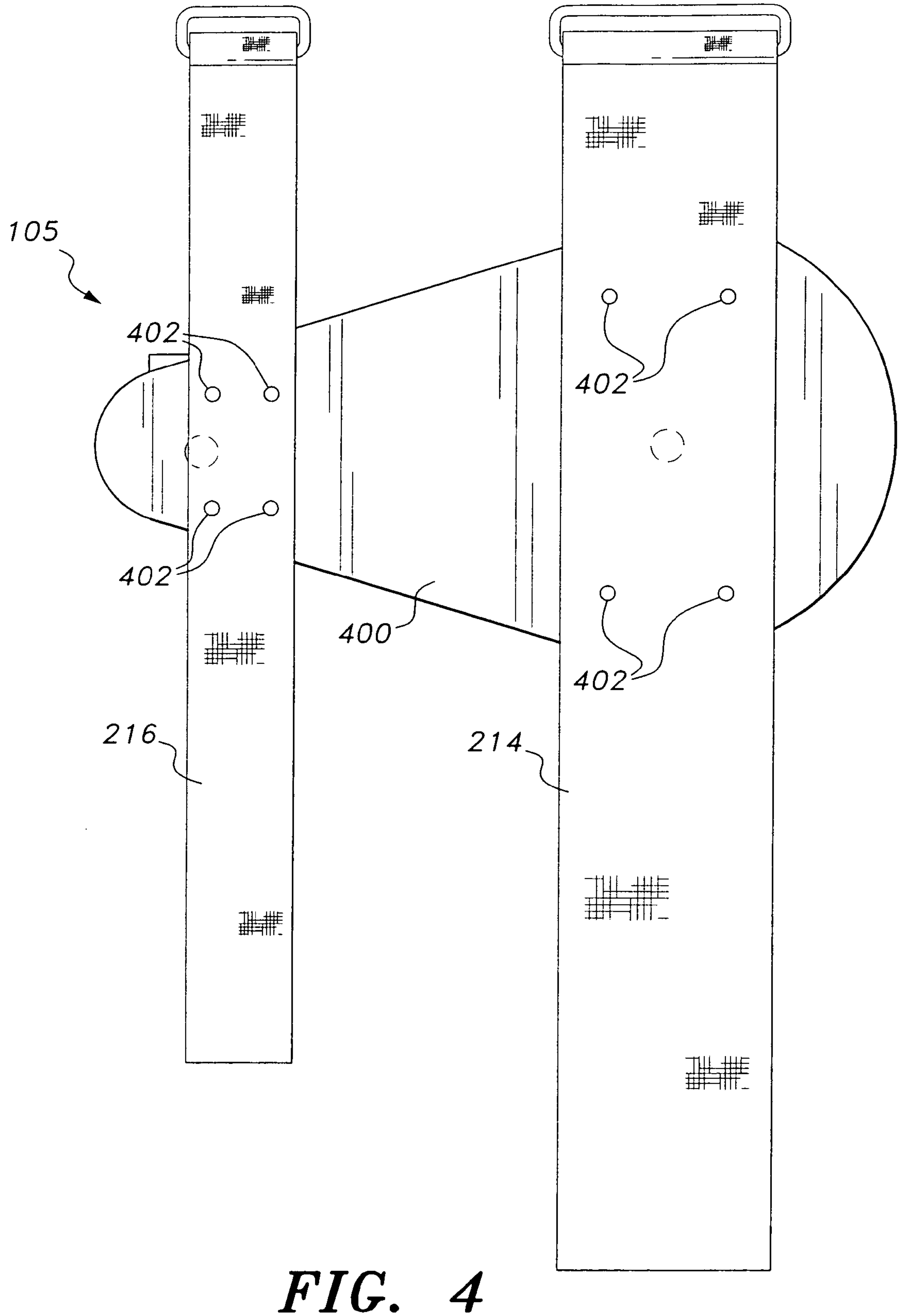
FIG. 4 is a bottom plan view of the dispenser with cutter according to the present invention, showing the lower surface of the base.

The present invention is a painter's tape dispenser 105 with cutter, shown attached to a user's forearm in FIG. 1. Referring to FIGS. 2 and 4, the painter's tape dispenser 105 is comprised of a base 206, a rotatable spindle or reel 204 adapted for holding a roll of tape, and a cutter 208 mounted on the base 206. The base 206 is generally an isosceles triangle in shape, having elongated sides and a relatively narrow base. The base 206 has a proximal end 210, a distal end 212, an upper surface 218, a lower surface 400, a tapered width Ww, a length L, and a thickness T. The proximal end 210 and the distal end 212 are rounded, to that there are no sharp points that might dig into the user's forearm. The base 206 is ergonomically dimensioned for a comfortable fit when in contact with the inside or inner aspect of a user's forearm.

Figure 3:
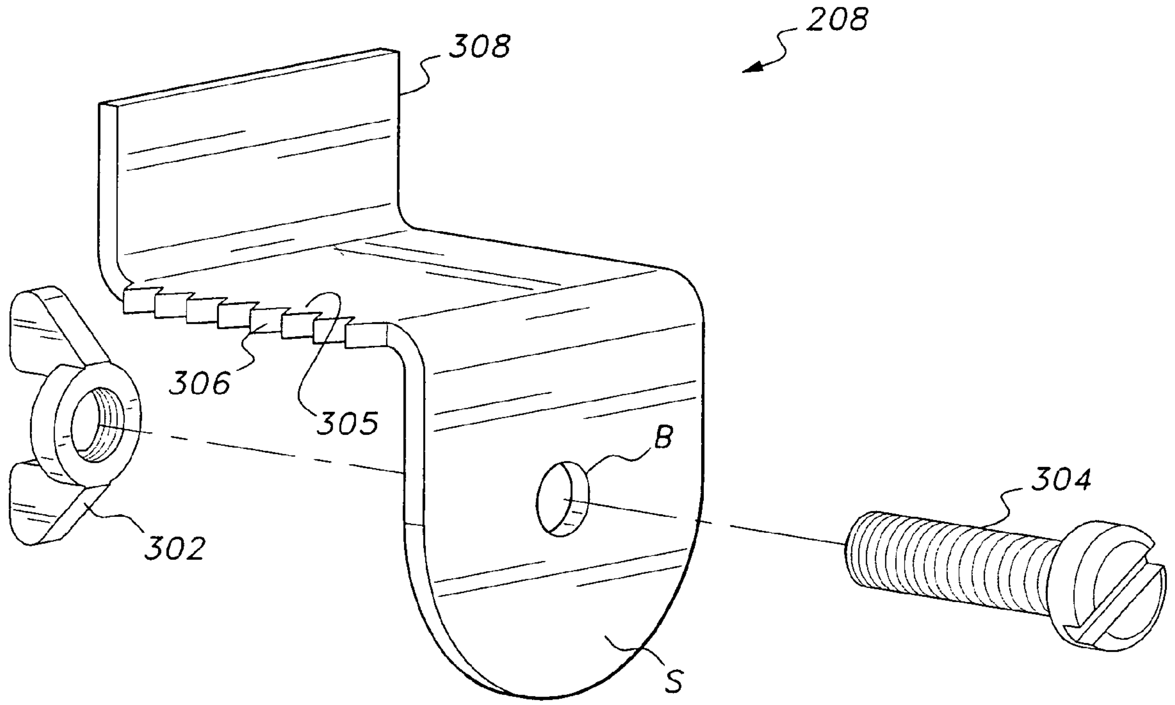
FIG. 3 is an exploded perspective view of the cutter according to the present invention.

As shown in FIGS. 2 and 3, the cutter 208 has a cutting plate with a top and a bottom and a cutting edge 305, preferably serrated, disposed towards the distal end 212 of the base 206, and is mounted on the base 206 along an axis 211 defined by the length L of the base 206 and towards a smaller end of the base 206. The rotatable spindle 204 is mounted on the base 206 along the axis 211 and towards the wider end of the base 206, near the proximal end 210 of the base 206.

The lower surface 400 of the tape dispenser 105 is secured to the inside of the forearm of the user by a pair of straps, e.g., a proximal strap 214 and a distal strap 216, which are made of nylon with hook and loop fastening material and have a guide loop similar to a buckle without the locking tang at one end of the strap, so that the tape dispenser 105 is positioned ready for hands-free tape dispensing when the spindle 204 is loaded. It should also be noted that proximal hook and loop strap 214 may be of a wider dimension than the distal hook and loop strap 216 in order to provide an ergonomic fit on the user's forearm, which typically has a larger diameter in the proximal region close to the elbow joint than in the distal region close to the wrist. Instead of hook and loop straps with guide loops, a plurality of adjustable elastic bands, a plurality of adjustable belts with buckles and notches for adjusting snugness of the fit of tool 105 to the user's forearm, or other straps may be used to secure the tape dispenser 105 to the user's forearm, the straps 214 and 216, bands, belts, or the like having a plurality of fasteners attaching the straps 214 and 216 to the lower surface 400 of the base 206.

Referring to FIGS. 2–4, the base width Ww is tapered, with the wider part of the base being at proximal end 210 and the narrower part of the base 206 being at distal end 212 of the base 206. Preferably, the width Ww of base 206 at its widest point is approximately four inches, and the width Ww of base 206 at an intersection between major axis 211 and a mounting point of cutter 208 is approximately one and three-quarter inches.

A preferable length L of the base 206 is approximately seven and one-half inches. Base 206 is made of a highly durable, moderately rigid, material, such as plywood, plastic, composites, aluminum, and the like. A preferable thickness T of the base 206, separating upper surface 218 from lower surface 400, is approximately one-quarter inches.

Proximal strap 214 provides for securing the tool 105 to the user's forearm near the elbow joint. Proximal strap 214 is attached to base 206 by a first plurality of screws, such as screws 402, threaded through the strap 214 and lower surface 400 of base 206 near both lateral edges. Similarly, distal strap 214 is attached by a second plurality of screws, such as screws 402, threaded through the strap 214 and lower surface 400 of base 206 near both distal edges. Distal strap 214 provides secure support of the tape dispenser 105 on the forearm near the wrist.

Thus, the pair of spaced apart straps 214 and 216 provide for secure attachment to the forearm and use continuously adjustable hook and loop fasteners to adjust to a forearm of any diameter and are provided with guide loops to ensure proper alignment of the ends of the straps to ensure mating of the hook and loop fasteners over the widest possible surface area.

As shown in FIG. 2, spindle 204, made of plastic or metal, is rotatably mounted towards the proximal end 210 of base 206 on the upper surface 218 of the base 206. The spindle 204 is preferably mounted on a central axis 211 of the base 206.

Spindle 204 may be attached to the base 206 with a nut and bolt, such as spindle nut SPN and spindle bolt SPB, or any other suitable pivotal mount. Using a nut and bolt for securement is advantageous in that the spindle 204 can be removed and replaced by a spindle 204 of different size to accommodate a different sized tape.

Referring again to FIGS. 2 and 3, the cutting edge 305 faces towards the distal end 212 of the base 206. This provides for ease of cutting the tape with minimal effort on the part of the user.

The cutter 208 comprises a unitary piece having a protective shoulder and guide, also referred to as a protector plate 308 normal to a cutting plate that has a top and a bottom and includes the cutting edge 305, which is normal to a mounting lug S with a through bore B for mounting to the base 206. Although the cutter 208 is preferably made out of a single piece of bent flat stock, more preferably 16 gauge steel, having the aforementioned configuration, it is within the scope of the present invention to include cutters of various sizes and made of other suitably strong and sharp material, such as plastic and the like. For example, another suitable configuration for cutter 208 may be a round piece of polyvinyl chloride (PVC) pipe with a cutout having serrated teeth.

Mounting of the cutter 208 is accomplished so that cutter 208 is disposed towards the distal end 212 of base 206, and preferably mounted on the base 206 along the central axis 211. The cutter 208 may be mounted, e.g., with a wing nut 302 and bolt 304. Wing nut 302 should be threaded onto bolt 304 with wing nut 302 disposed on the upper surface 218 of base 206 in order not to disturb the ergonomic point of contact of lower surface 400 the base 206 with the user.

The wing nut mount for cutter 208 is provided so that the cutter 208 can be readily interchanged with a replacement cutter similar to cutter 208, but which may have different cutting characteristics, i.e., coarser or finer serrations 306 on the cutting edge 305.

In addition, it is contemplated that rolls of other flexible material, such as electrical wiring, police crime scene tape, and the like may also be dispensed with the tape dispenser 105 of the present invention.

It is to be understood that the present invention is not limited to the embodiment described above, but encompasses any and all embodiments within the scope of the following claims.

I claim:

1. A painter's tape dispenser, comprising:

a flat, planar base, the base having the shape of an elongated isosceles triangle with rounded vertices defining a wide proximal end, a narrow distal end, an upper surface, and a lower surface;

said base having a major axis which extends from said wide proximal end to said narrow distal end, with the upper surface of said base disposed within a single plane;

a rotatable spindle mounted on the upper surface of the base at said major axis and adjacent the wide proximal end, the spindle being adapted for mounting a roll of tape thereon;

a cutter removably mounted on the upper surface of the base at said major axis and adjacent the narrow distal end, said cutter comprising:

a mounting lug removably mounted on and extending parallel to said base, a cutting plate having a top facing in an upward direction, a bottom facing in a downward direction, a first end and a second end, said cutting plate extending normal to the mounting lug with said cutting plate first end joined to said mounting lug, said mounting lug extending away from said cutting plate and in the same direction that said bottom is facing, the cutting plate defining a cutting edge extending away from said spindle, and a protector plate extending from the second end of said cutting plate, said protector plate extending away from and normal to the cutting plate and in the same direction that said top is facing, wherein the cutter is made from a single piece of flat steel bent to form the mounting lug, cutting plate, and protector plate;

a pair of straps attached to the lower surface of the base and extending generally perpendicular to the major axis of said base, the straps being spaced apart and adapted for mounting the base on the inner aspect of a user's forearm with the proximal end adjacent the user's elbow and the distal end adjacent the user's wrist;

whereby the tape dispenser and the cutter are conveniently available for hands-free dispensing and cutting of the tape.

2. The painter's tape dispenser as claimed in claim 1, wherein each of said straps comprises a nylon strap having hook and loop fastening material attached thereto for wrapping each strap around the user's forearm and continuously adjusting the strap to the forearm's diameter.

3. The painter's tape dispenser as claimed in claim 2, wherein each of said straps further comprises a guide loop attached to one end of the strap for aligning opposite ends of the straps.

4. The painter's tape dispenser as claimed in claim 1, wherein the each of said straps comprises an elastic band.

5. The painter's tape dispenser as claimed in claim 1, wherein said base has a width of about four inches at the proximal end.

6. The painter's tape dispenser as claimed in claim 5, wherein said base has a length of about seven and one-half inches.

7. The painter's tape dispenser as claimed in claim 6, wherein said base has a thickness of about one-quarter of an inch.

8. The painter's tape dispenser as claimed in claim 1, wherein said base is made of rigid material.

9. The painter's tape dispenser as claimed in claim 1, wherein said cutting edge is serrated.

10. The painter's tape dispenser as claimed in claim 1, wherein said base is made from rigid plastic material.

11. The painter's tape dispenser as claimed in claim 1, further comprising a bolt and a wing nut removably mounting said cutter to said base, whereby said cutter may be interchangeably replaced in order to adjust sharpness of the cutter.

* * * * *